Dec. 6, 1949   W. M. HUSTON   2,490,132
POWER SHOVEL
Filed July 26, 1945   5 Sheets-Sheet 1

INVENTOR
William M. Huston
BY
ATTORNEYS

Dec. 6, 1949     W. M. HUSTON     2,490,132
POWER SHOVEL

Filed July 26, 1945     5 Sheets-Sheet 2

INVENTOR
William M. Huston
BY
ATTORNEYS

Dec. 6, 1949 W. M. HUSTON 2,490,132
POWER SHOVEL
Filed July 26, 1945 5 Sheets-Sheet 4
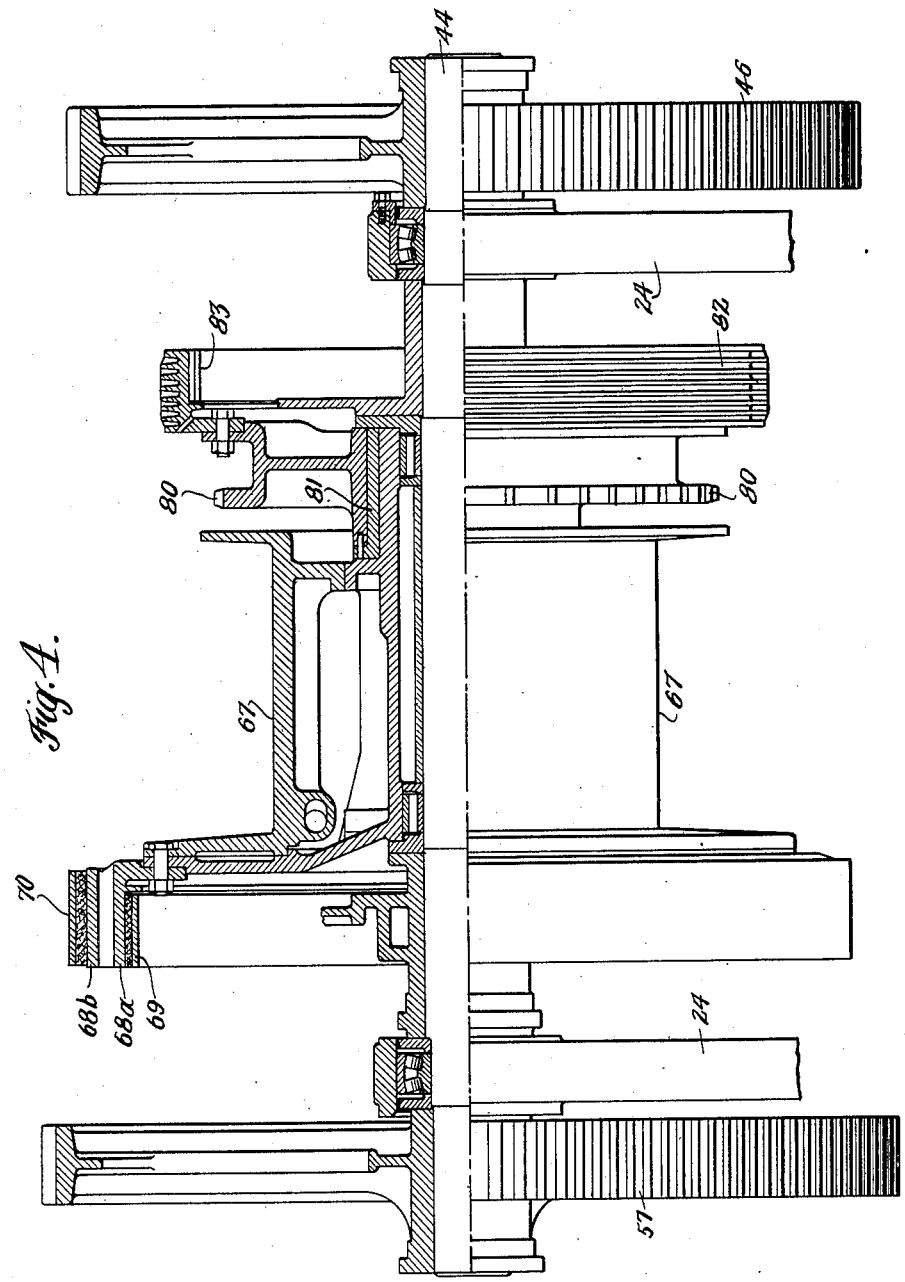
INVENTOR.
William M. Huston
BY
ATTORNEYS Dec. 6, 1949     W. M. HUSTON     2,490,132
POWER SHOVEL
Filed July 26, 1945     5 Sheets-Sheet 5
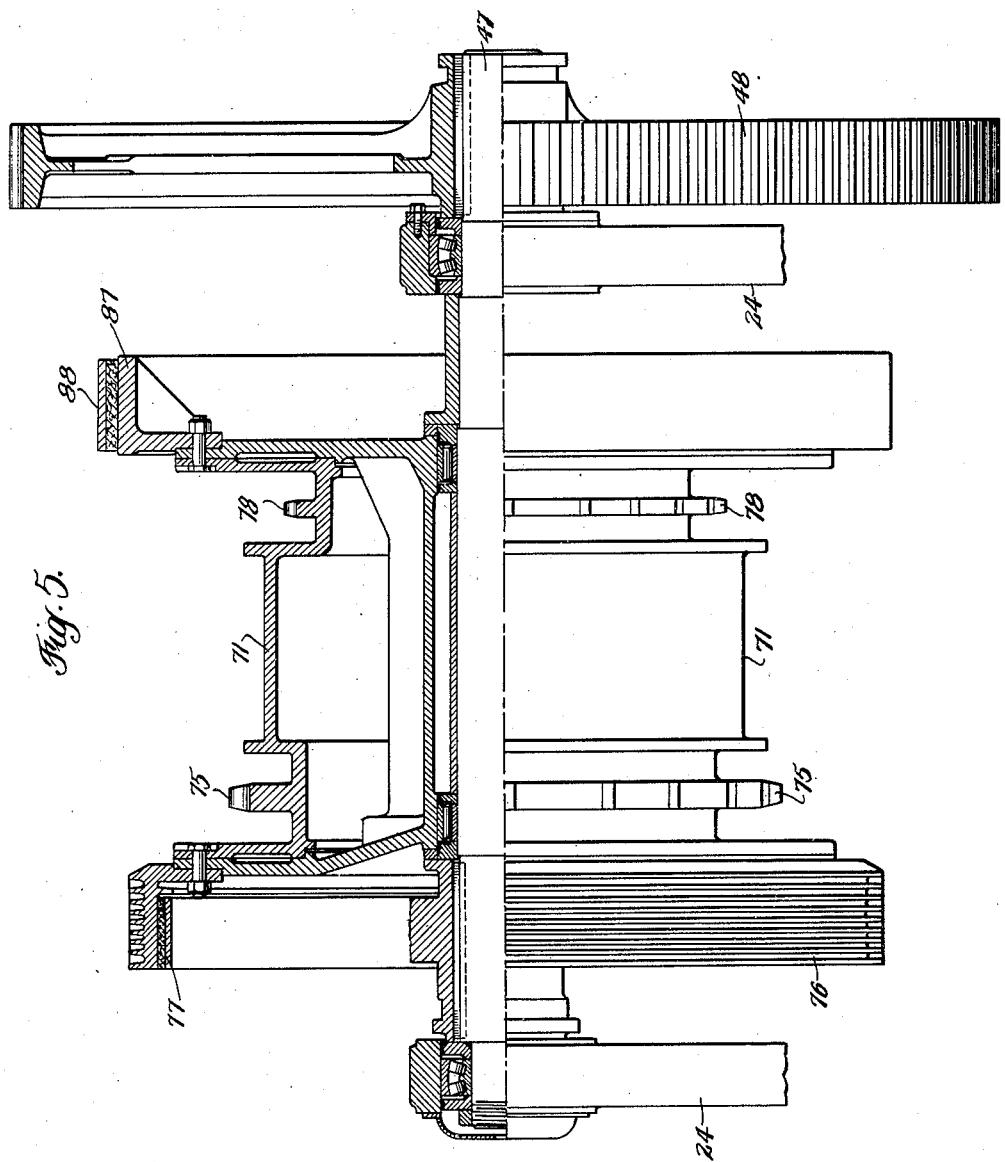
INVENTOR.
William M. Huston
BY
*Synnestvedt & Lechner*
ATTORNEYS Patented Dec. 6, 1949

2,490,132

UNITED STATES PATENT OFFICE 2,490,132

POWER SHOVEL

William M. Huston, Lima, Ohio

Application July 26, 1945, Serial No. 607,157

4 Claims. (Cl. 214—135)

This invention relates to load handling equipment and is particularly concerned with power shovels.

The invention, moreover, is especially adapted to power shovels of large size and large digging capacity.

One of the primary objects of the invention is the provision of operating machinery, particularly for performing the functions of crowd-out, crowd-retract and dipper hoisting, which operating machinery is capable of effecting powerful digging effort and is arranged to provide improved flexibility from the standpoint of control of the machine.

According to the invention, a novel arrangement of power shafts is utilized to provide the functions of crowd-out, crowd-retract and dipper hoisting, as will further appear.

The foregoing and other objects and advantages pointed out hereinafter, can best be understood by reference to the following description referring to the accompanying drawings, which illustrate the preferred embodiment of the invention and in which—

Figure 4 is a transverse view partly in elevation and partly in section, illustrating the rear drum shaft assembly; and Figure 5 is a view similar to Figure 4 but illustrating the front drum shaft assembly.

Figure 1:
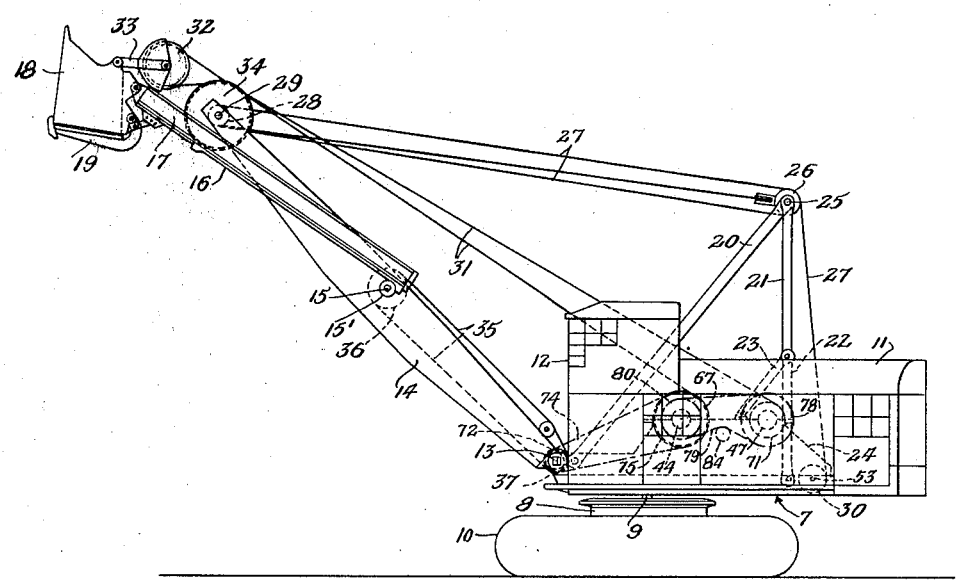
Figure 1 is a left-hand side view in outline of a power shovel constructed according to the present invention.

From Figure 1 it will be seen that the power shovel of the present invention comprises a rotating base 7 which is mounted for swing motion on the crawler truck 8 about the vertical axis of shaft 9. The crawler truck is provided with treads such as indicated at 10 on which the machine is adapted to travel on the ground. The rotating base carries a cab structure 11 which serves to enclose the power plant and operating machinery which is carried on the rotating base. An operator's station is provided at 12 in a tower which is located toward one side of the machine (the near side when viewed as in Figure 1).

At its forward end the rotating base 7 carries pivots 13 by means of which the boom 14 is mounted on the base with freedom for upward and downward swinging movement. About midway of its length, the boom carries a shipper shaft 15 having a pinion 15' thereon adapted to cooperate with the rack diagrammatically indicated at 16, which rack is mounted on the dipper handle or stick 17. The dipper 18 is arranged at the outer end of the stick 17 and is provided with a door 19.

Figure 2:
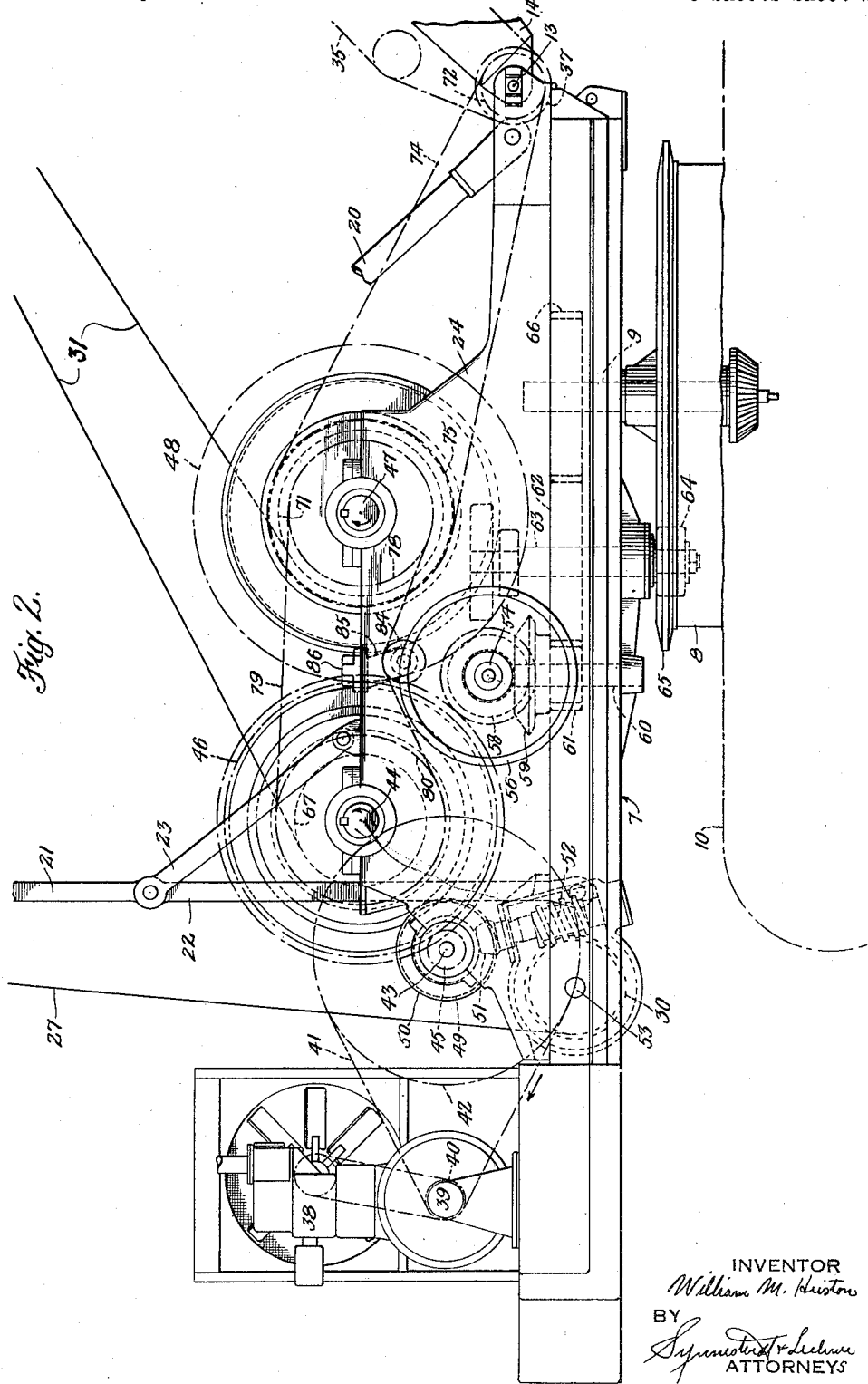
Figure 2 is a right-hand side view of the rotating base of the machine shown in Figure 1 illustrating the power plant and various units of the operating machinery, this view being on a substantially enlarged scale as compared with Figure 1.
Figure 3:
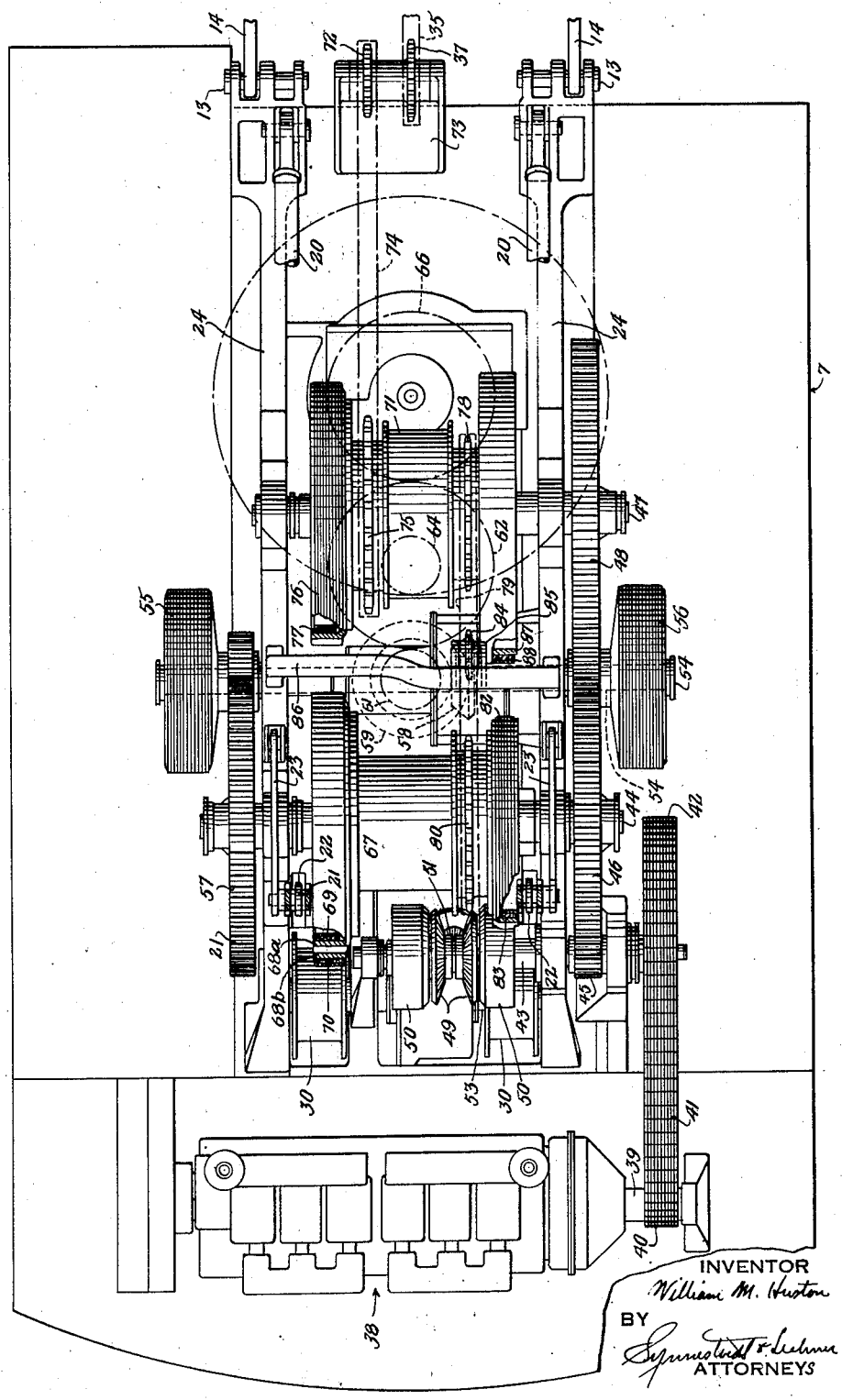
Figure 3 is a top-plan view of the parts shown in Figure 2.

The rotating base also serves to carry the gantry structure, including the front compression legs 20, and upper and lower rear compression legs 21—22, the rear legs being connected by braces 23 with the machinery frames 24 (see also Figures 2 and 3). The gantry headshaft 25 carries sheaves 26 adapted to cooperate with the multiple runs of the boom hoist cable 27, which extends to the boom point to pass over sheaves 28 which are mounted on boom point shaft 29. The two ends of the boom hoist cable 27 extend downwardly to the rear of the gantry legs 21—22, to be reeved on a pair of boom hoist drums 30 (see also Figures 2 and 3). The boom hoist cable 27 is adapted to be operated by mechanism described more fully herebelow.

The function of dipper hoist is effected by means of a dipper hoist cable 31, which cooperates with a sheave 32 mounted adjacent the dipper 18 by means of brackets 33. The two ends of the cable 31 pass over large diameter sheaves 34 which are arranged coaxially of the boom point shaft 29 and extend therefrom downwardly for cooperation with cable drums mounted on certain power shafts on the rotating base, as is described more fully herebelow.

The shipper shaft 15 is adapted to be operated to effect crowd-out and crowd-retract functions by means of a crowd chain 35, which passes over a sprocket 36 fixed on the shipper shaft, and also over a sprocket 37 (see also Figures 2 and 3), which latter is arranged coaxially with the boom mounting pivots 13.

The foregoing features of general arrangement of the machine illustrated in Figure 1 form no part of the present invention per se and therefore need not be described in detail herein. It may be mentioned, however, that the boom, dipper and dipper stick may be of customary construction. It is further noted that certain features mentioned above, and also others described hereinafter, constitute subject matter disclosed and claimed in certain copending applications. For instance a gantry structure of the type shown in Figure 1 is fully disclosed in copending application Serial No. 603,380, filed July 5, 1945, now Pat. No. 2,440,199, granted April 20, 1948. Suitable mechanism for effecting drive of the crawler truck is disclosed in copending application Serial No. 454,792, filed August 14, 1942, now Patent No. 2,387,208 granted October 23, 1945. It is here further noted that certain features of the general arrangement of the rotating base and operating machinery are disclosed in copending applications Serial Numbers 603,376 and 603,382, now Patent No. 2,458,271, granted January 4, 1949, both filed July 5, 1945.

Turning now to Figures 2 and 3, it is first noted that the power plant or engine 38 is mounted on the rotating base 7 toward the rear end thereof. The engine shaft 39 carries a sprocket 40 with which a chain 41 cooperates, this chain being associated with sprocket 42 which is mounted on the jackshaft 43. Power is delivered from the jackshaft to the rear hoist drum shaft 44 through pinion 45 and gear 46. The front hoist drum shaft 47 is driven from gear 46 by means of an additional gear 48.

The function of boom hoist need not be considered in detail herein, although it should be noted that the boom hoist transmission includes bevel gears 49 which are clutchable to the jackshaft by means of clutch units 50, the bevel gears meshing with a bevel pinion 51, which serves to drive the worm 52 engaging a worm wheel mounted on the boom hoist shaft 53 and providing for delivery of power to the boom hoist drums 30. This boom hoist drive mechanism is more fully disclosed in copending application Serial No. 603,376, above referred to.

A horizontal reversing shaft 54 is mounted in the machinery frames 24 intermediate and below the drum shafts 44 and 47. A pair of clutch units 55 and 56 are mounted on the outer ends of the shaft 54. The housing of the clutch unit 56 has a pinion fixed thereto meshing with gear 48, which is carried by the front drum shaft 47, and the housing of clutch unit 55 also has a pinion fixed thereto meshing with a gear 57 fixed on the rear hoist drum shaft 44. By alternative engagement of the clutches 55 and 56, the horizontal reverse shaft 54 may be driven in either direction. Power is transmissible from shaft 54 through bevel gearing 58—59 to the vertical reverse shaft 60 which carries a pinion 61 meshing with the gear 62 mounted on shaft 63. Shaft 63 extends downwardly to the truck structure 8 and is provided with a gear 64 adapted to engage an internal ring gear formed just inside the roller track 66 in order to effect swing motion of the rotating base on the truck structure. A gear 66 mounted on the vertical propel shaft 9 and meshing with gear 62 provides for delivery of power to the truck structure whereby to effect drive of the crawler treads. Mechanism (not shown) is provided for alternatively effecting drive of the swing shaft 63 and of the vertical propel shaft 9. This mechanism need not be considered in detail herein, since the same is disclosed in copending application Serial No. 603,376, identified above, and also in issued Patent 2,354,863 of August 1, 1944.

The function of dipper hoist is effected through cable 31, above described, one end of this cable being reeved on a cable drum 67 which is supported by the rear drum shaft 44. A combined dipper hoist clutch and brake unit is associated with drum 67, including an annular member 68—a with the inner surface of which an internal expanding clutch 69 is adapted to cooperate, this clutch serving to connect the member 66—a and thus the drum 67 with the shaft 44. The dipper hoist brake takes the form of another cylindrical member 68—b fixed to rotate with member 68—a and with the drum 67, the member 68—b cooperating with an external contracting brake band 70. The opposite end of the dipper hoist cable 31 is reeved on a drum 71 which is mounted on the front hoist shaft 47, for a purpose to be described hereinafter.

The dipper crowd mechanism includes the crowd chain 35 and the cooperating sprockets 36 and 37, above mentioned, the sprocket 37 being connected to rotate with a sprocket 72. These sprockets 37 and 72 are mounted in common by means of a bracket 13 which is secured to the rotating base adjacent the forward edge thereof in position so that the axis of the sprockets is coincident with the pivots 13 for the boom. A chain 74 cooperates with sprocket 72 and also with a sprocket 75 mounted on the front drum shaft 47. Sprocket 75 has a clutch housing 75 secured to rotate therewith, and an internal expanding clutch 77 serves to connect the housing 76 and thus the sprocket 75 with shaft 47. This portion of the mechanism performs the function of crowd-out. The function of crowd-retract is effected by mechanism described below.

In addition to drum 71, sprocket 75 and clutch housing 76, the shaft 47 further carries a sprocket 78, which sprocket, together with the parts 71, 75 and 76, are all fixed to rotate together. A chain 79 engages sprocket 78 and also another sprocket 80 which is mounted on the shaft 44 for rotation thereon independently of the dipper hoist drum 67, for which purpose a bearing bushing 81 is provided (see Figure 4). A clutch housing 82 is fixed to the sprocket 80 and an internal expanding clutch 83 serves to connect the clutch housing 82 and thus the sprocket 80 with the shaft 44. This portion of the mechanism provides for crowd-retract operation, since shaft 44 rotates in the opposite direction from shaft 47. It will be understood that during operation of the retract clutch 83, the clutch 77 is disengaged, and further that during operation of the clutch 77, the clutch 83 would, of course, be disengaged.

An adjustable tightener for chain 79 advantageously takes the form of an idler sprocket 84 which is mounted by a bracket 85 depending from the transverse interbrace 86 which extends between the upper edges of the machinery frames 24—24.

A brake for the crowd mechanism is provided, this brake including a brake drum 87 with which a brake band 88 cooperates. The brake drum 87 is fixed to rotate with sprockets 75 and 78, the drum 71 and the clutch housing 76. Thus, all of the elements carried by the front hoist shaft 47 rotate together.

Attention is now directed to the reeving of the dipper hoist cable 31 on the drum 71. From Figures 1 and 2 it will be noted that the sense in which the cable is reeved on drum 71 is such that during operation of the dipper hoist clutch 69, crowding effort is transmitted through the cable and drum 71 to the crowd sprocket 75. In this way, when both the crowd clutch and the dipper hoist clutch are operated, a very powerful crowding effort is provided, which is of advantage for certain types of digging, for instance when digging in rocky ground. On the other hand, under conditions where the digging is relatively easy, sufficient crowding effort may at times be provided by operation of the dipper hoist, without engagement of the crowd clutch. It will be understood, of course, that the crowd clutch is capable of operation independently of, and at times when the dipper hoist clutch is not operated.

Beyond the foregoing, for certain types of work, the dipper hoist cable 31 may if desired be dead-ended, for instance by attaching the end of the cable at some suitable point on the boom toward the lower end thereof. This type of operation is effective to increase the speed of dipper hoisting.

It is further mentioned that in addition to the advantages referred to above, with respect to operation of the power shovel, and particularly the functions of crowd and dipper hoist, the general arrangement of the machinery employed (especially the employment of a jackshaft 43 from which power for boom hoist is taken, and the employment of the front and rear main drum shafts 41 and 44), is readily adaptable to conversion of the machine to other forms such, for instance, as cranes, drag lines, or other load handling machines. An example of the adaptability of the basic elements of the machinery will be seen by comparison of the disclosure of the present application with the disclosure of copending application Serial No. 603,376, above referred to, wherein essentially the same arrangement of shafts and other parts of the machinery is illustrated as adapted to a crane.

Additionally, suitable arrangements of crowd cables and drums may be adapted for use with the remainder of the mechanism, in place of using chains and sprockets.

I claim:

1. In a power shovel having a rotating base carrying a power plant, operating machinery and a dipper-supporting boom, a pair of drum shafts rotated by the power plant in opposite directions, dipper crowd mechanism connectible alternatively with said shafts to effect crowd-out and crowd-retract, a dipper hoist cable drum mounted on that shaft which provides for crowd-retract operation, a second cable drum mounted on the other shaft, and a dipper hoist cable the ends of which are respectively reeved on said drums.

2. A construction according to claim 1 in which the second cable drum is fixed to rotate with the crowd mechanism and in which the end of the dipper hoist cable which is associated with said second drum is reeved thereon in a sense such that operation of the dipper hoist cable drum contributes crowd-out effort to the crowd mechanism through the dipper hoist cable.

3. In a power shovel having a rotating base carrying a power plant, operating machinery and a dipper-supporting boom, front and rear power shafts rotated by the power plant in opposite directions, dipper crowd mechanism including a rotative driving element connectible with one of said shafts and providing for crowd-out operation, a second rotative driving element connectible with the other of said shafts and providing for crowd-retract operation, a first cable drum connectible with one of said shafts, a second cable drum connectible with the other of said shafts, and a dipper hoist cable, the ends of which are respectively reeved on said two drums.

4. In a power shovel having a rotating base carrying operating machinery and a dipper-supporting boom, a pair of drum shafts, dipper crowd mechanism associated with one shaft including a crowd clutch member, a pair of crowd actuating elements, and a crowd brake member mounted on said shaft, a cable drum also mounted on the said shaft, said clutch member, actuating elements, brake member, and drum all being fixed to rotate together, a second cable drum mounted on the other shaft, and a dipper hoist cable the ends of which are respectively reeved on said two drums, whereby the rotation of the second cable drum effects simple hoisting action when the first drum is held against rotation by the action of said brake, and hoisting and crowd booster action when the elements associated with the first shaft are free to rotate.

WILLIAM M. HUSTON.

REFERENCES CITED

The following references are of record in the file of this patent:

UNITED STATES PATENTS

| Number | Name | Date |
|---|---|---|
| 1,627,869 | Ronk | May 10, 1927 |
| 1,966,759 | Huston | July 17, 1934 |
| 2,022,168 | Wilson | Nov. 26, 1935 |
| 2,035,385 | McLean | Mar. 24, 1936 |
| 2,140,988 | Duckelow et al. | Dec. 20, 1938 |
| 2,339,700 | Huston | Jan. 18, 1944 |

Certificate of Correction

Patent No. 2,490,132 December 6, 1949

WILLIAM M. HUSTON

It is hereby certified that errors appear in the printed specification of the above numbered patent requiring correction as follows:

Column 3, line 5, for the patent number "2,387,208" read *2,387,268*; line 54, for "track 66" read *track 65*; line 75, for "member 66—a" read *member 68—a*; column 4, line 15, for "bracket 13" read *bracket 73*; line 21, for "housing 75" read *housing 76*; and that the said Letters Patent should be read with these corrections therein that the same may conform to the record of the case in the Patent Office.

Signed and sealed this 28th day of March, A. D. 1950.

[SEAL]

THOMAS F. MURPHY,
*Assistant Commissioner of Patents.*